(12) United States Patent
McCormack et al.

(10) Patent No.: US 8,662,892 B2
(45) Date of Patent: Mar. 4, 2014

(54) UNIVERSAL HANDS-ON TRAINER (UHOT)

(75) Inventors: Patrick E. McCormack, Tucson, AZ (US); Jon E. Peoble, Tucson, AZ (US); Brian C. Gaume, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 162 days.

(21) Appl. No.: 13/272,162

(22) Filed: Oct. 12, 2011

(65) Prior Publication Data
US 2013/0095452 A1    Apr. 18, 2013

(51) Int. Cl.
*F41A 33/00* (2006.01)

(52) U.S. Cl.
USPC .......................................................... 434/11

(58) Field of Classification Search
USPC ............... 434/11, 15, 19, 29, 45, 38, 219, 16; 463/36–38
See application file for complete search history.

(56) References Cited

U.S. PATENT DOCUMENTS

| | | | |
|---|---|---|---|
| 5,158,459 A * | 10/1992 | Edelberg ......................... | 434/45 |
| 5,215,462 A | 6/1993 | Lewis et al. | |
| 5,470,232 A | 11/1995 | Kelso et al. | |
| 6,106,298 A * | 8/2000 | Pollak ............................. | 434/29 |
| 6,270,350 B1 * | 8/2001 | Christopher .................... | 434/69 |
| 6,431,989 B1 * | 8/2002 | Katayama et al. .............. | 472/60 |
| 6,461,238 B1 * | 10/2002 | Rehkemper et al. ............. | 463/6 |
| 6,902,483 B2 * | 6/2005 | Lin .................................. | 463/37 |
| 7,436,400 B2 * | 10/2008 | Cheng ............................ | 345/204 |
| 2001/0055978 A1 * | 12/2001 | Herrod et al. .................. | 455/517 |
| 2004/0018481 A1 * | 1/2004 | Smith et al. .................... | 434/365 |
| 2004/0029094 A1 * | 2/2004 | McGraw ........................ | 434/365 |
| 2006/0183083 A1 * | 8/2006 | Moran et al. .................... | 434/11 |
| 2007/0218427 A1 * | 9/2007 | Lefton ............................ | 434/29 |
| 2007/0264617 A1 * | 11/2007 | Richardson et al. ............ | 434/30 |
| 2008/0254415 A1 * | 10/2008 | Barry .............................. | 434/29 |
| 2009/0269724 A1 * | 10/2009 | Thomas .......................... | 434/45 |
| 2009/0325704 A1 * | 12/2009 | Tom et al. ....................... | 463/39 |
| 2010/0159434 A1 * | 6/2010 | Lampotang et al. ........... | 434/365 |

FOREIGN PATENT DOCUMENTS

EP            0118604 A2      9/1984

\* cited by examiner

*Primary Examiner* — Peter Egloff
(74) *Attorney, Agent, or Firm* — Eric A. Gifford

(57) ABSTRACT

A Universal Hands-On Trainer (UHOT) for use with an interactive training simulator and software plug-in that provides the "fit" and "function" of a piece of equipment provided with tactical handgrips but not the "form". The UHOT has an assembled shape and structure that is both scaled-down and different from that of the real piece of equipment. Because the UHOT does not replicate the "form" of any piece of equipment, the UHOT is not limited to training only one piece of equipment. Different tactical handgrips may be attached to the UHOT to provide training with the correct "fit" for a wide variety of equipment. The UHOT may be provided with a universal interface and various adapters to attach different tactical handgrips.

25 Claims, 12 Drawing Sheets

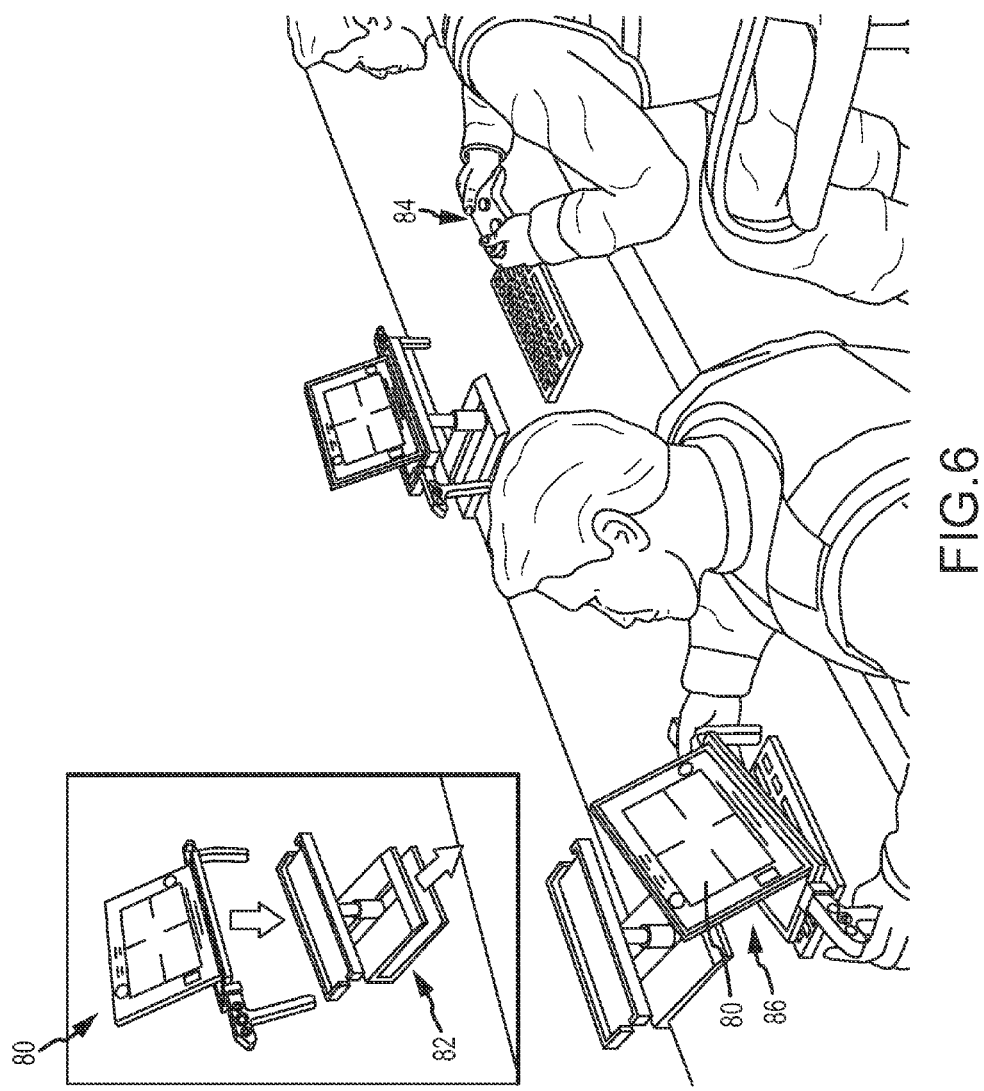

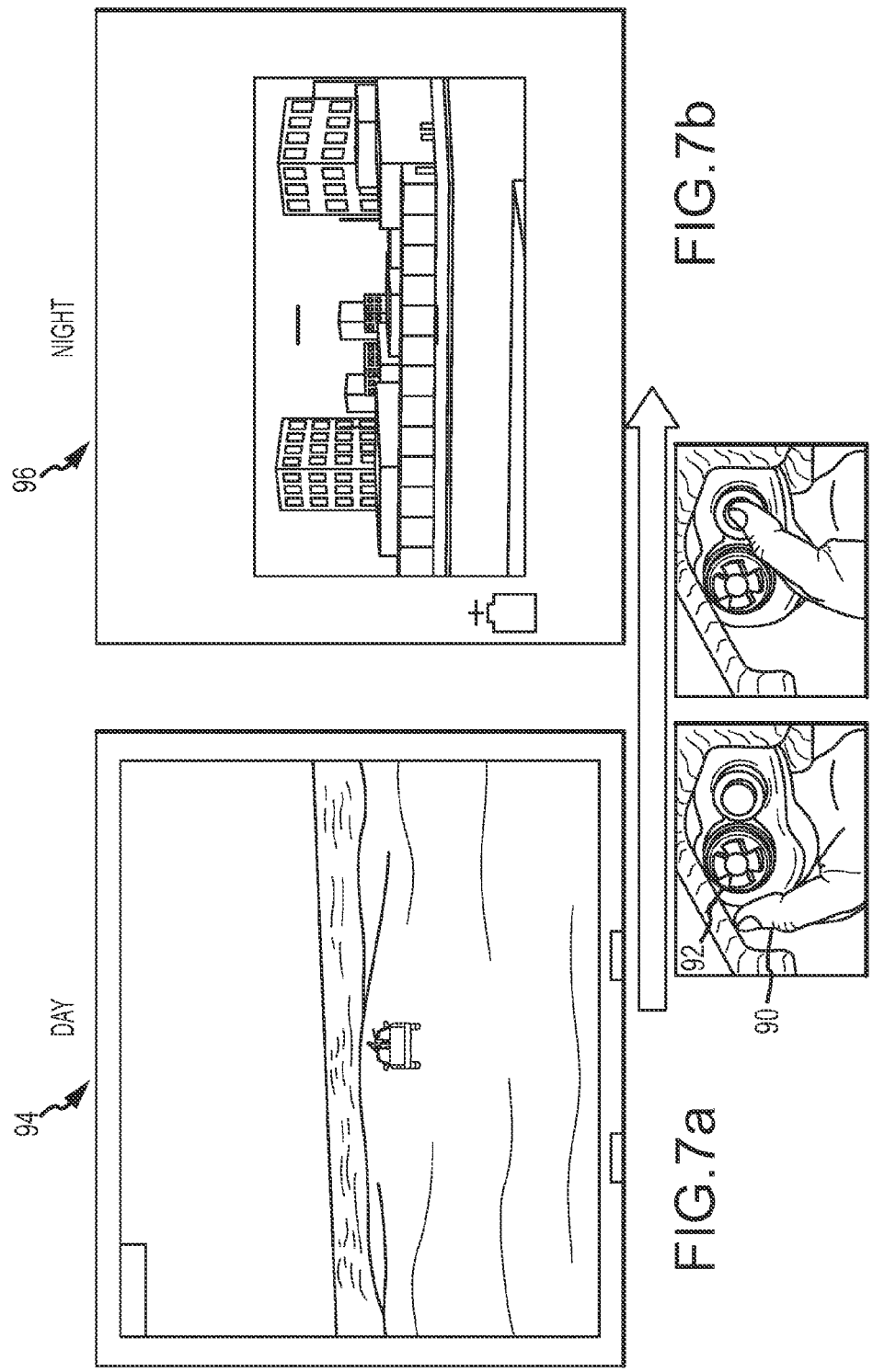

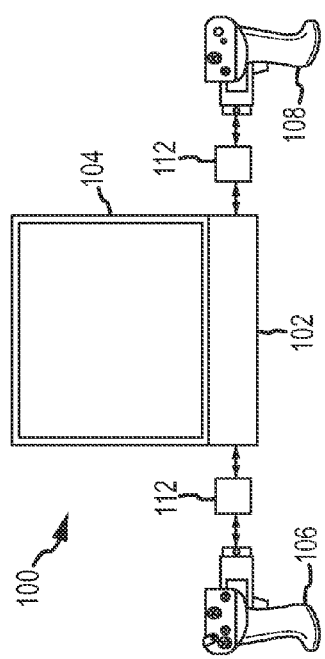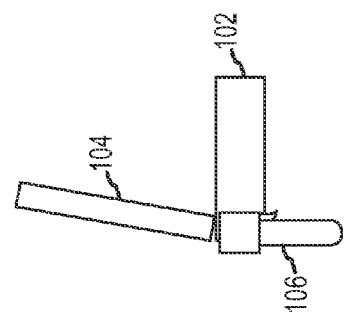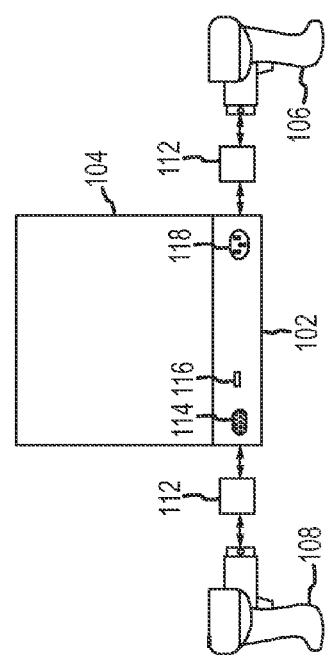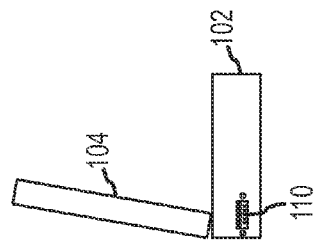

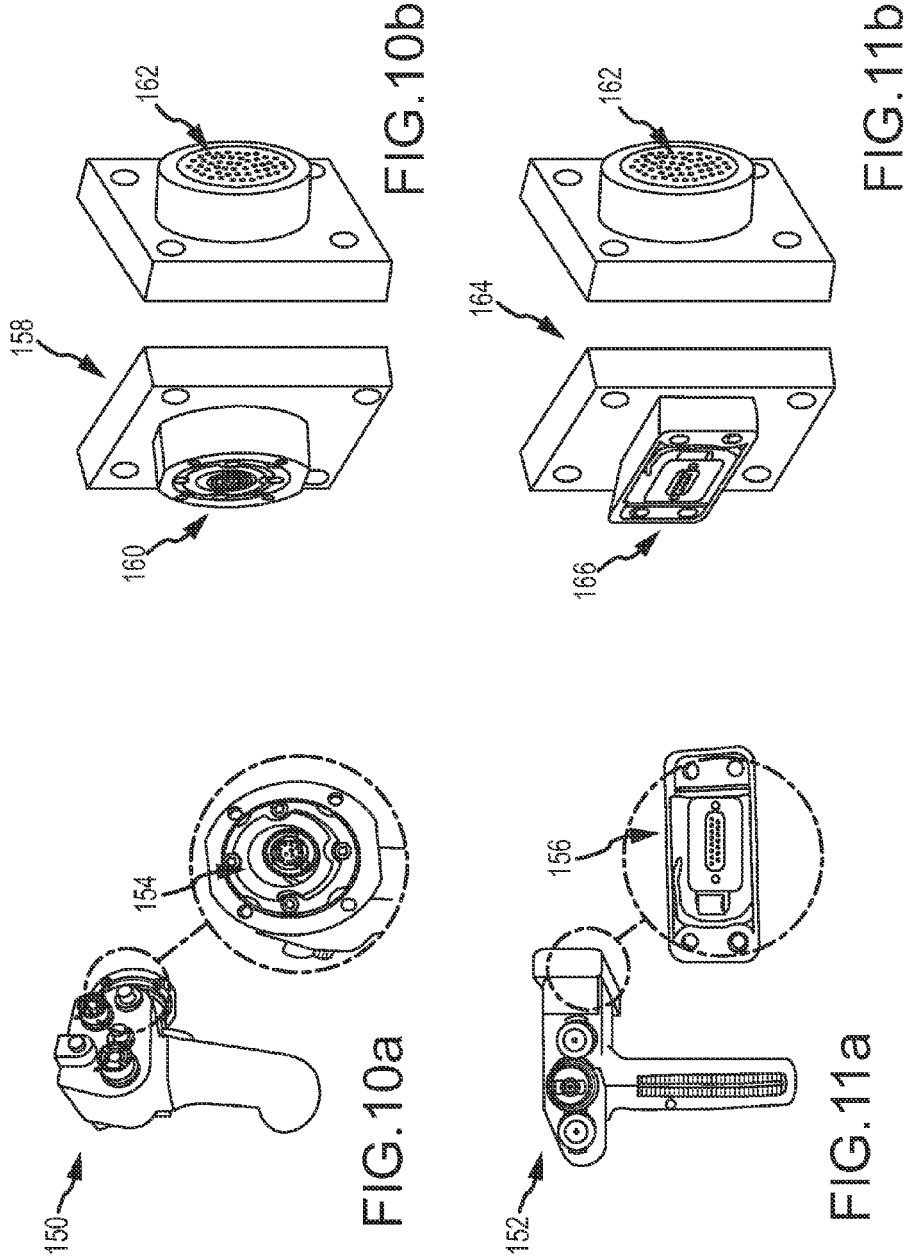

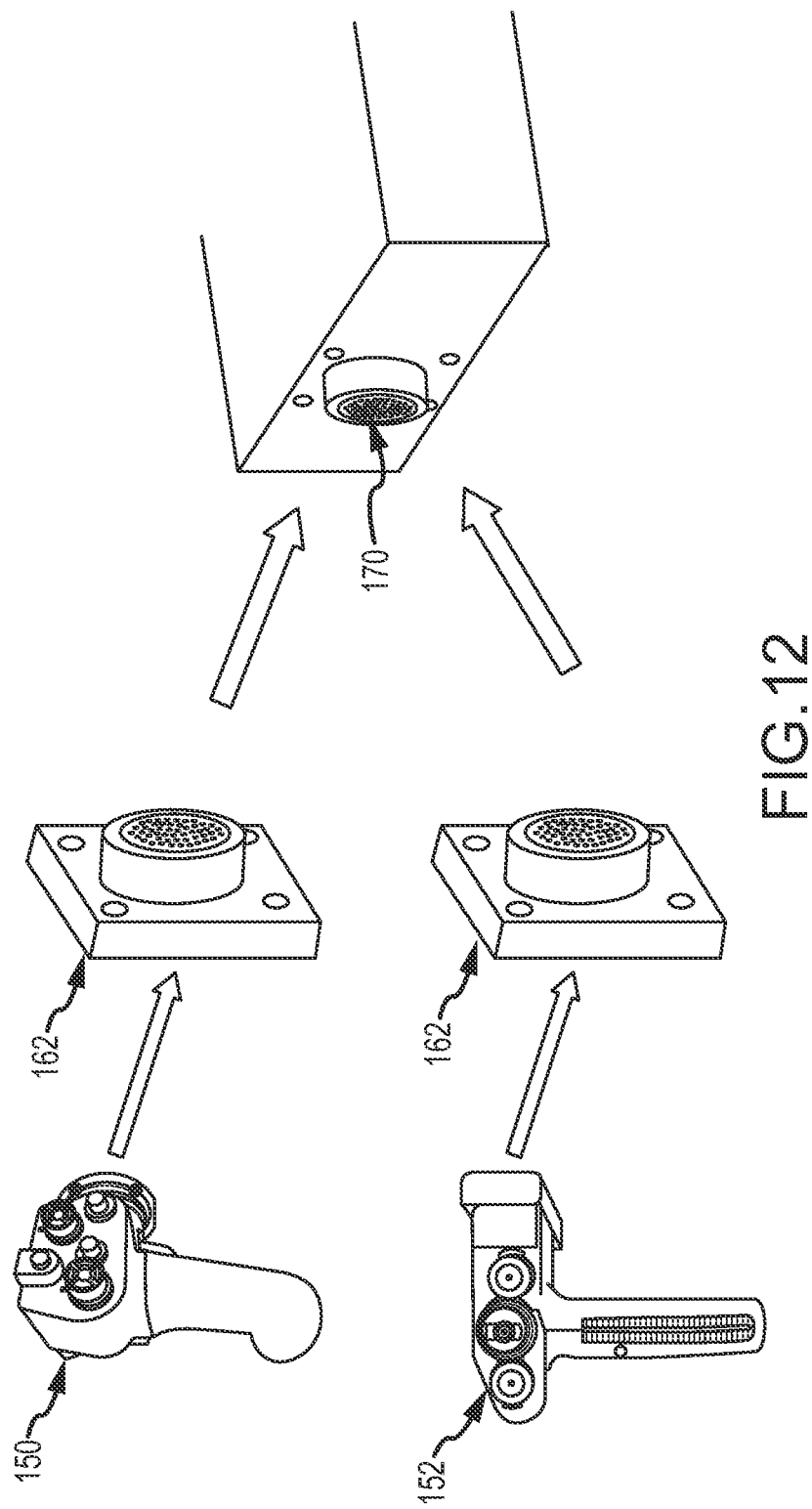

UNIVERSAL HANDS-ON TRAINER (UHOT)

BACKGROUND OF THE INVENTION

1. Field of the Invention

This invention relates to training simulators for training users to operate equipment that is manipulated via handgrips, and more particularly to a "hands on" trainer provisioned with the handgrips of the equipment to provide training with the proper "fit". The "hands on" trainer may be provisioned with different handgrips associated with different equipment via a universal interface.

2. Description of the Related Art

Certain types of military, law enforcement and commercial equipment are manipulated at least in part via tactical handgrips. The tactical handgrips allow the user to change the viewpoint of and operate the equipment. The equipment may be characterized by its "form, fit and function". The tactical handgrips adapted for a piece of equipment, and particularly the placement, feel, and spacing of all switches, buttons, and triggers on the hand-grips define the equipment's "fit". The equipment's assembled shape and structure (e.g. size, weight, and shape of assembled components) define its "form". The actions for which the equipment is specially fitted or for which the equipment exists define its "function".

Users may be trained to operate the equipment by training on real equipment or on a training simulator. In the latter case, the training simulator generates a video signal to simulate the use of the equipment in a training scenario. The user may interact with the video signal via a mock-up that closely replicates the actual equipment, in which case the training simulator and mock-up simulate the equipment function and provide the fit and form. Mock-ups are provided with special purpose software for that particular piece of equipment to train a single user on the basic skills associated with the use of that piece of equipment. Alternately, the user may interact with the video signal in a general purpose computing environment e.g. a computer display and keyboard/gamepad, in which case the training simulator only simulates the equipment function and provides neither the fit nor form. This type of interactive environment supports a more general purpose simulation that can be configured for multiple users and to support the simulation of different pieces of equipment.

As shown in FIG. 1, a tactical Javelin Missile System 10 comprises a Command Launch Unit (CLU) 12 and a missile 14 (inside a launch tube). The system is controlled through CLU tactical handgrips 16, which feature an assortment of buttons, triggers, and switches. The gunner may change the system viewpoint using the tactical handgrips e.g. turning his body while holding the handgrips. The gunner views his surrounding environment through an eye-piece 18, which includes both a normal optical sensor and an advanced thermal sensor. The optical sensors operates similar to binoculars, the gunner is directly viewing the environment through the use of optical lenses. The thermal sensor operates similar to a digital camera. The sensor captures thermal information, processes it, and then displays a thermal image to the gunner on a digital screen that is viewed through the eyepiece. The eye-piece includes a set of optical lenses that magnify and focus the direct visible light and displayed thermal imagery. The gunner manipulates the buttons, triggers and switches on the tactical handgrips in response to his environment to fire the missile, hence perform the "function" of the missile.

While the gunner is operating the Javelin Missile System, the gunner is viewing his environment through the CLU eyepiece and therefore cannot view the handgrips. Thus, an important part of a gunner's training on the Javelin is learning the "fit" of the weapon system; the layout of the buttons, triggers and switches on the handgrips, so that he can make use of trained muscle memory and quickly operate the system.

To operate the Javelin Missile System, the gunner must rest the missile on his shoulder and aim the missile by turning his body and the missile. Thus, another important part of a gunner's training on the Javelin is learning the "form" of the weapon system; the size, shape and weight of the assembled components that define the system's assembled shape and structure. The Javelin Missile System has an assembled shape and structure defined primarily by the missile tube attached to the CLU and an overall weight of approximately 50 pounds. As shown in FIG. 2, a Javelin Basic Skills Trainer (BST) 20 is used to train gunners on the basic skills of the Javelin Weapon System. The Javelin BST is "single-player" and comes with a pre-defined set of scenarios for the user to practice on. The Javelin Basic Skills Trainer (BST) 20 comprises a simulation command launch unit (SCLU) 22, a missile simulation round (MSR) 24 and a host computer 26 that hosts an interactive training simulator. The SCLU is connected to the host computer through a custom, military-grade cable 28 that allows for video to be sent to the SCLU and for data to be passed back and forth to simulate the Javelin "function". The SCLU and MSR are accurate, physical mock-ups of the real Javelin Weapon System that closely mimic both the Javelin's "fit" through the placement, feel, and spacing of all switches, buttons, and triggers on the CLU hand-grips and "form" through the size, weight of approximately 50 pounds, and feel of the Missile and the CLU that replicate the tactical Javelin. Although still expensive, the BST costs much less than a CLU and live missile. The SCLU replaces the optical and thermal sensors of the tactical CLU with a small computer monitor that receives a video image from the attached computer. The SCLU eyepiece 30 includes a set of optical lenses that magnify the small monitor and allows a gunner to view the imagery being sent by the computer. The handgrips are the same handgrips as used in the real system and are directly connected to the shell of the SCLU. They are hardwired to a microcontroller that resides within the SCLU and are not removable. A set of motion sensors inside the SCLU detects motion to generate signals of a changing viewpoint within the simulation. The microcontroller converts the button pushes and viewpoint signals to binary data that is transmitted through cable 28 to the interactive training simulator.

The BST is used for training users on the basic skills of the Javelin Weapon System. The interactive training simulator is "single-player" and comes with a pre-defined set of scenarios for the user to practice on. The interactive training simulator only contains a single Environment Simulator which represents a single weapon system such as the Javelin Weapon System. This allows the BST to mimic the "function" of the real Javelin Weapon System. By accurately representing the Form, Fit, and Function of the real system, the BST provides a close representation of the single weapon system it is designed for.

As shown in FIG. 3, in a general purpose computing environment one or more interactive training simulators 40 can be used to train soldiers 42 to operate different weapon systems in a variety of single and multiuser scenarios. The interactive training simulator software may be hosted on each simulator 40 or on a server. The human interface to the simulation environment for each of the weapon systems is a direct-view computer display 44 (no eyepiece) to view the simulation video signal and an input device 46 such as a mouse and keyboard, joystick or gamepad that facilitates user interaction with the simulation. Such simulators are used for unit training and mission rehearsal and allow multiple users to train together within the same interactive simulator. This type of training simulator is much more flexible and cost effective than the BST and provides numerous Environment Simulators, each of which can represent different weapon systems. This allows the user to train on varying weapon systems in a wide variety of customizable scenarios. An Environment Simulator for the Javelin Weapon System is also included, and can be designed to a level of fidelity needed to represent the function of the real system.

The interative training simulators 40 provide neither form nor fit of the weapon interface. The keyboard/mouse, joystick or gamepad do not provide the "fit" of the tactical handgrips. The soldiers seated at a computer display do not experience the "form" of the Javelin Missile System, its cumbersome size and shape and weight. However, software plug-ins can be added to the training simulators that would allow a BST to communicate with the weapon Environment Simulator, bringing the "form and fit" of the weapon system back into the training environment. The plug-in resides with the interactive training simulator on the host computer and translates binary data output by the BST's microcontroller into button pushes and viewpoint data to provide connectivity to the Environment Simulator.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a Universal Hands-On Trainer (UHOT) for use with an interactive training simulator that provides the "lit" and "function" of a piece of equipment provided with tactical handgrips but not the "form". The UHOT has an assembled shape and structure that is both scaled-down and different from that of the real piece of equipment. Because the UHOT does not replicate the "form" of any piece of equipment, the UHOT is not limited to training only one piece of equipment. Different tactical handgrips may be attached to the UHOT to provide training with the correct "fit" for a wide variety of equipment. The UHOT may be provided with a universal interface and various adapters to attach different tactical handgrips.

In an embodiment, the UHOT comprises a direct-view display for displaying a training simulation video signal for the piece of equipment, a pair of the tactical handgrips that provide the UHOT with the fit of the piece of equipment and a docking station that supports the display and handgrips. The docking station comprises a pair of connectors for electromechanically attaching the pair of tactical handgrips, said connectors responsive to electrical button pushes from the handgrips in response to user interaction with the displayed training simulation video signal, one or more sensors for detecting user instigated motion of the docking station via the handgrips to generate electrical sensor signals of a changing viewpoint within the simulation, and a microcontroller that converts the electrical button pushes and the electrical sensor signals to binary data, said training simulator video signal responsive to the binary data. The UHOT has a different and scaled-down assembled shape and structure that provide a different form than the piece of equipment. The UHOT may be provided with a software plug-in resident in an interactive training simulator that translates the binary data into button pushes and viewpoint data to provide connectivity to the interactive training simulator that runs the simulation for the piece of equipment. The interactive training simulator may be external to the UHOT or integrated therein. Different pairs of tactical handgrips may be attached to (and detached from) the UHOT for use with different equipment modules in the interactive training simulator. The different tactical handgrips may be accommodated using a universal interface on the UHOT and adapters to the different tactical handgrips. By sacrificing "form", a single UHOT may provide training for a wide variety of equipment with the proper "fit".

These and other features and advantages of the invention will be apparent to those skilled in the art from the following detailed description of preferred embodiments, taken together with the accompanying drawings, in which:

BRIEF DESCRIPTION OF THE DRAWINGS

FIG. 6 is a diagram of an embodiment of an integrated UHOT within a multiuser interactive training simulator;

FIGS. 7a and 7b are diagrams illustrating the Javelin simulation changing from day sight to night sight with the press of a button on the UHOT handgrips;

FIGS. 8a-8d are front, rear and side views with and without handgrips of an embodiment of the UHOT;

FIGS. 10a-10b and 11a-11b are diagrams of two different pair of handgrips and their respective adapters to a universal interface on the UHOT;

FIG. 12 is a diagram of the two different handgrips connected to the universal interface on the UHOT through their particular adapter.

DETAILED DESCRIPTION OF THE INVENTION

Once a user has become accustomed to the "form" of the equipment through basic skills training, the provision of only the "function" and "fit" of the equipment during more advanced single user and multiuser training may be sufficient, and in some scenarios preferable. The environment provided by the interactive training simulator provides the flexibility for more advanced single and multiuser training, can accommodate training on a wide variety of equipment, and is more convenient and more cost effective than a Basic Skills Trainer.

The present invention provides a Universal Hands-On Trainer (UHOT) for use with an interactive training simulator and software plug-in that provides the "fit" and "function" of a piece of equipment provided with tactical handgrips but not the "form". The UHOT has an assembled shape and structure that is both scaled-down and different from that of the real piece of equipment. The UHOT is in general smaller, less cumbersome and lighter weight than either the real equipment or BST (and less expensive). As such, the UHOT is easier to physically incorporate into the interactive training simulator and to use during actual training. Because the UHOT does not replicate the "form" of any piece of equipment, the UHOT is not limited to training only one piece of equipment. Different tactical handgrips may be attached (and detached) to the UHOT and paired with corresponding equipment modules in the environment simulator to provide training with the correct "fit" for a wide variety of equipment. The UHOT may be provided with a universal interface and various adapters to attach different tactical handgrips. A universal connectors and adapters may create a "modular" UHOT in which different handgrips can be attached/detached with ease. The universal IF may be configured to recognize which pair of handgrips is attached and send a signal to the simulation trainer to select the corresponding environment simulator/equipment module. By sacrificing "form", a single UHOT may provide training for a wide variety of equipment with the proper "fit".

The UHOT may be used for training on equipment provided with tactical handgrips. The tactical handgrips adapted for a piece of equipment, and particularly the placement, feel, and spacing of all switches, buttons, and triggers (collectively "buttons") on the hand-grips define the equipment's "fit". The hand grips also provide the trainee's physical interface with the equipment to hold, stabilize and change the viewpoint. Exemplary equipment includes the Javelin, LRAS3 and TOW/ITAS systems, weapon systems on the Bradley Fighting Vehicle, Abrams Tank and Stryker Vehicle and flight simulators. UHOT may also be used with other pieces of equipment that use tactical handgrips to operate the equipment via the handgrip buttons and to change the viewpoint of the equipment.

Figure 1:
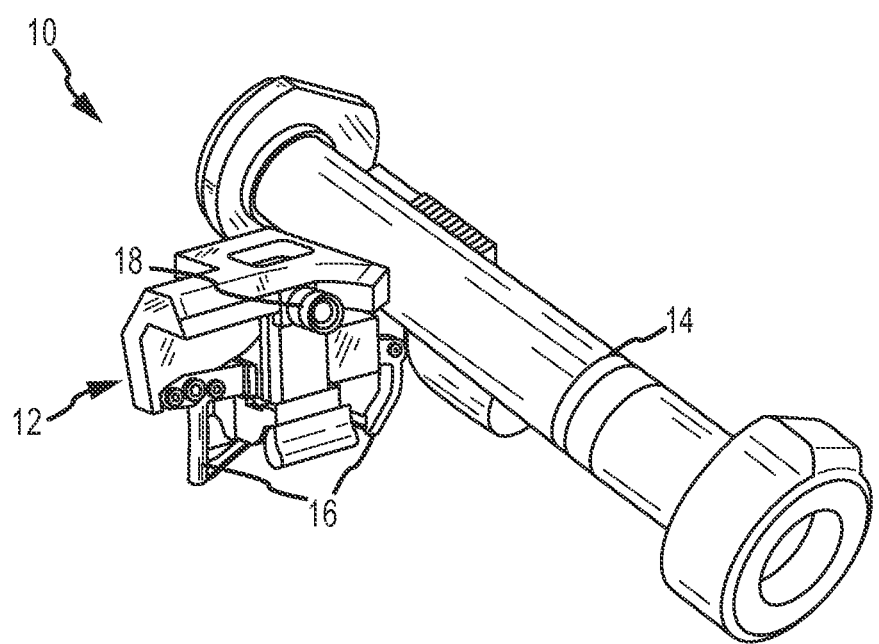
FIG. 1, as described above, a Javelin Command Launch Unit (CLU) and missile.
Figure 2:
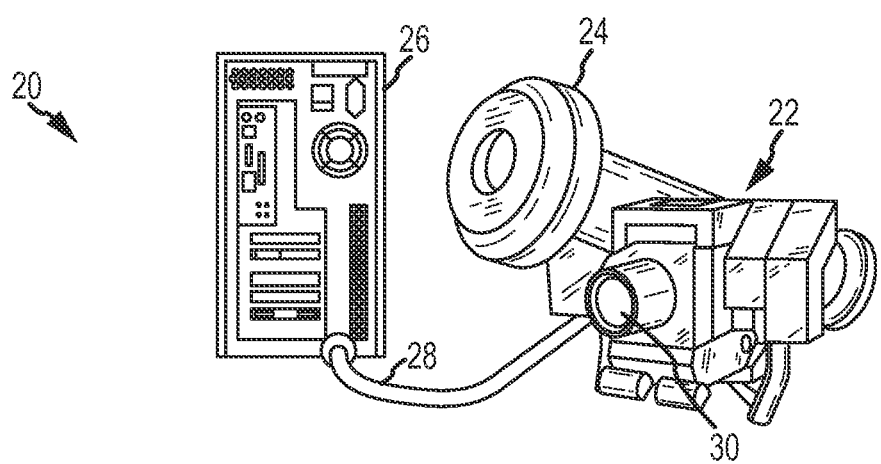
FIG. 2, as described above, is a Javelin Basic Skills Trainer (BST) comprising a Simulation CLU (SCLU), a Missile Simulated Round (MSR) and host computer that runs the simulation software.
Figure 3:
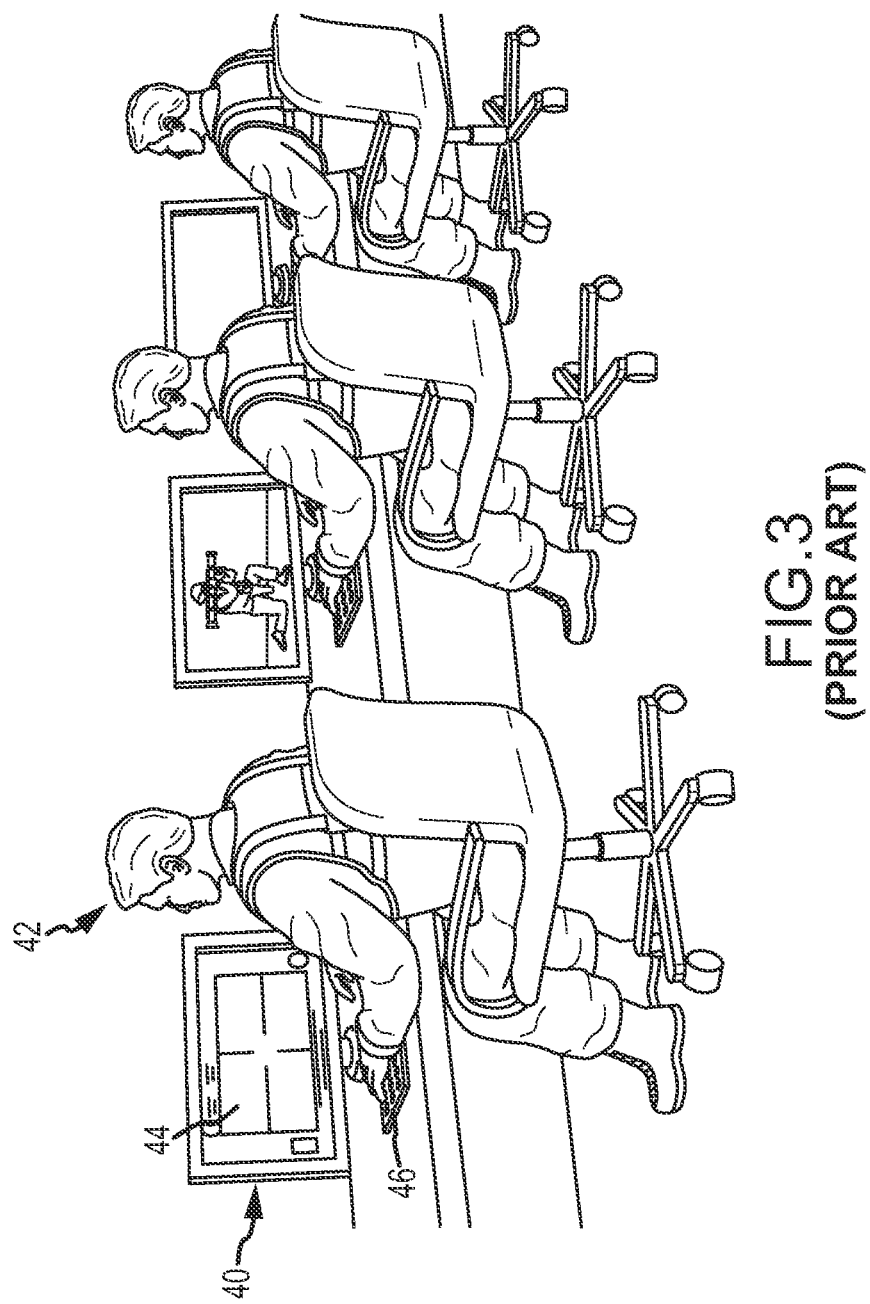
FIG. 3, as described above, is a multiuser interactive training simulator comprising computers that may be provisioned with a plug-in for use with the Javelin BST.
Figure 4:
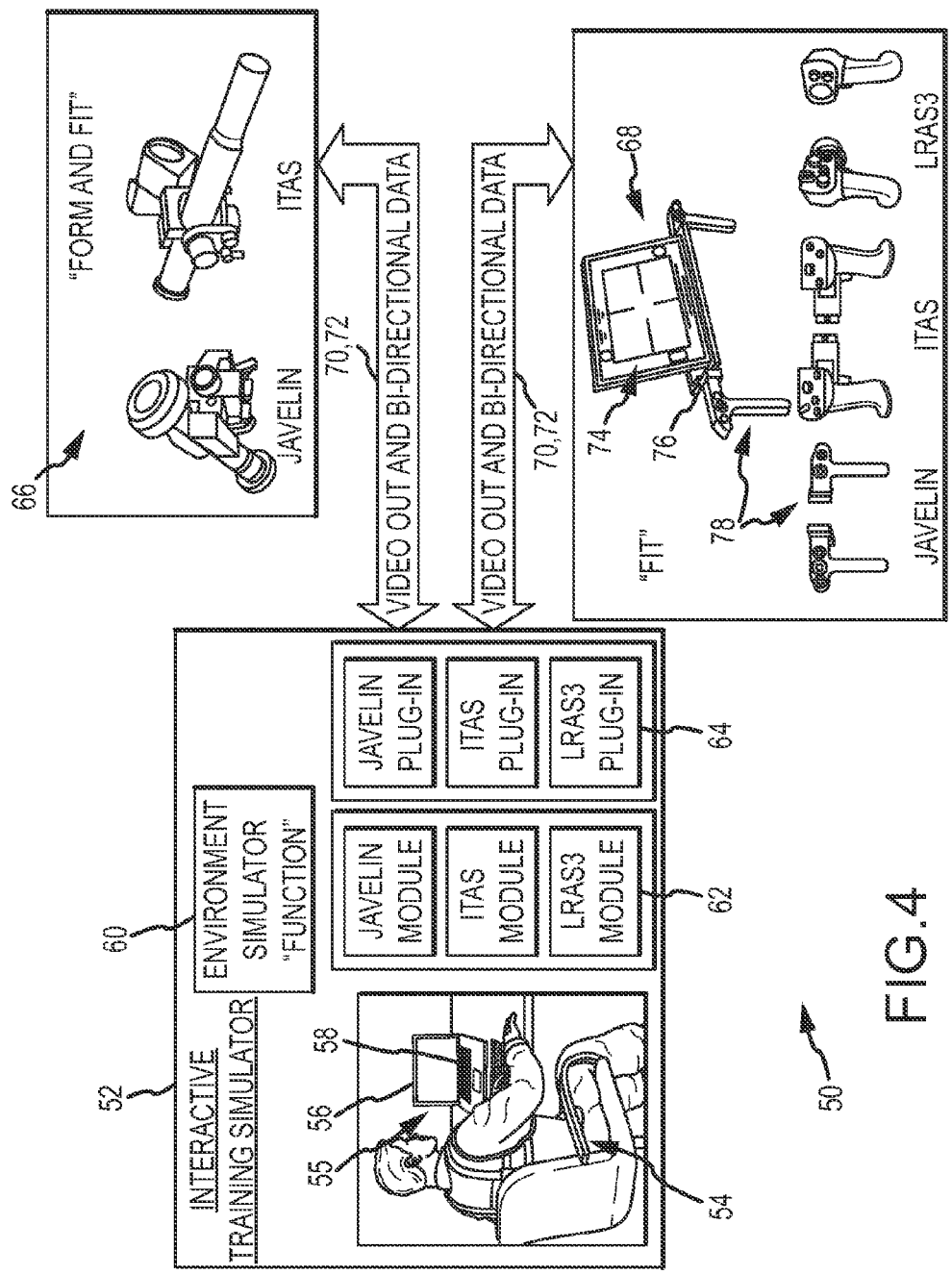
FIG. 4 is a diagram of an embodiment of a training simulator providing connectivity to a universal hand-on trainer (UHOT) and a basic skills trainer (BST)

As shown in FIG. 4, an exemplary embodiment of a training simulator 50 for training soldiers in varying combat single and multiuser scenarios. Training simulator 50 comprises one or more interactive training simulators 52 for one or more soldiers 54. Each interactive training simulator 52 comprises a host computer 55 for running the simulation, a direct-view display 56 for displaying a simulation video signal and an input device 58 such as a mouse and keyboard, joystick or game pad for interaction with the simulation.

Each host computer 55, or alternately a server that serves multiple simulators 52, comprises one or more environment simulators 60 that runs on the host computer to present the soldier(s) with the interactive training scenarios via the simulation video signal displayed on direct-view display 56. The soldier(s) uses input device 58 to perform the interactive training exercise. A given training scenario may involve one or more soldiers performing a variety of tasks either independently or in a coordinated effort. One of these tasks may be to use a particular piece of equipment such as a Javelin, ITAS or LRAS3 systems that are outfitted with tactical handgrips. To simulate such a task, the environment simulator 60 executes a weapon module 62 for the corresponding system that simulates the use of that piece of equipment. The soldier is trained on the "function" of the particular missile system but input device 58 provides neither the "fit" nor "form" of the missile system. The environment simulator will execute a variety of other modules to perform other types of tasks such as firing a gun, detonating a bomb, using a radio, moving within the combat environment etc.

To enhance the training experience on the missile systems, simulator 60 can be provided with a weapon plug-in 64 that resides on the host computer. The plug-in translates incoming binary data from either a Basic Skills Trainer (BST) 66 or a UHOT 68 into button pushes and viewpoint data to provide connectivity to the corresponding weapon module to simulate the function of that weapon in the environment simulator. The simulator sends the simulation video signal via a communication link 70 (e.g. a cable and video connection or a wireless connection) to either the BST or UHOT. The simulator sends commands to the BST or UHOT via a bi-directional data link 72 (e.g. a cable and USB connection or a wireless connection) and receives the binary data from the BST or UHOT. The commands are typically non-equipment specific such as turn-on, calibrate, status query or maintenance signals.

BST 66 adds both the "fit" and "form" of the weapon system to the training simulator so that the soldier may be trained on the full "form, fit and function" of the weapon system within the interactive training environment. However, to provide the "form" of the weapon system the BST is a "mock-up" that replicates all of the components of the tactical weapon system with the same size, shape and weight: This can be very expensive. A BST for Javelin is expensive and weighs approximately 50 pounds. A BST for ITAS is expensive and weighs upwards of 70 pounds. A BST for LRAS3 does not exist. Furthermore, the BSTs are very cumbersome to store, pick up and use in the general purpose computing environment of the interactive training simulator. Typically, soldiers are seated at a long table in front of their computer to participate in the training scenario. Because of cost or simple inconvenience the BSTs are rarely used in these interactive training simulators.

UHOT 68 adds only the "fit" of the weapon system to the training simulator so that the soldier may be trained on "fit and function" of the weapon system within the interactive training environment. By sacrificing "form", the UHOT can have a smaller and lighter weight assembled shape and structure that is more amenable to use in the interactive training simulator environment. For example, the UHOT will not include a dummy mock-up of the weapon itself. An exemplary UHOT may weigh approximately 6-7 pounds.

UHOT 68 comprises a direct-view display 74 such as an LCD (no eyepiece) for displaying the simulation video signal, a docking station 76 that supports the display and a pair of tactical handgrips 78 for the weapon system that are attached to (and detached from) the docking station. The docking station is provided with motion sensors that detect user instigated motion to generate electrical sensor signals of a changing viewpoint within the simulation. A microcontroller converts electrical button pushes from the handgrips and the electrical sensor signals into the binary data that is sent to the interactive training simulator. The docking station may be integrated with the direct-view display or a separate component. Furthermore, the interactive training simulator 52 may be integrated into UHOT 68. In this configuration, the UHOT 68 may rest in a cradle to perform the training scenario using the input device. When it comes time to operate the weapon system, the soldier may use the handgrips to pick the UHOT up out of the cradle and aim and fire the weapon (as in Javelin) or to rotate the UHOT in the cradle on a gimbal to aim and fire the weapon (as in ITAS).

As shown a single UHOT 68 may be outfitted with different tactical handgrips 78 corresponding to different weapon systems. In an embodiment, the UHOT may be configured to detect if handgrips are attached, to identify the type of handgrips (e.g. Javelin, ITAS or LRAS3) and to send an identifier to the interactive training simulator, which in turn activates the corresponding weapons module and plug-in to activate the UHOT. Because the varying tactical handgrips may have different electro-mechanical connectors, the docking station may be provided with a universal connector. Adaptors (not shown) include a universal mating connector for attachment to the docking station's universal connector and a weapon-specific connector for attachment to the handgrip. The adaptors may have varying width to replicate the spacing of the handgrips on the weapon system. UHOT provides a modular training device that can be used to train a soldier on variety of weapons system within the interactive training environment with the proper "fit" of the weapons system at a lower price than a BST.

Figure 5:
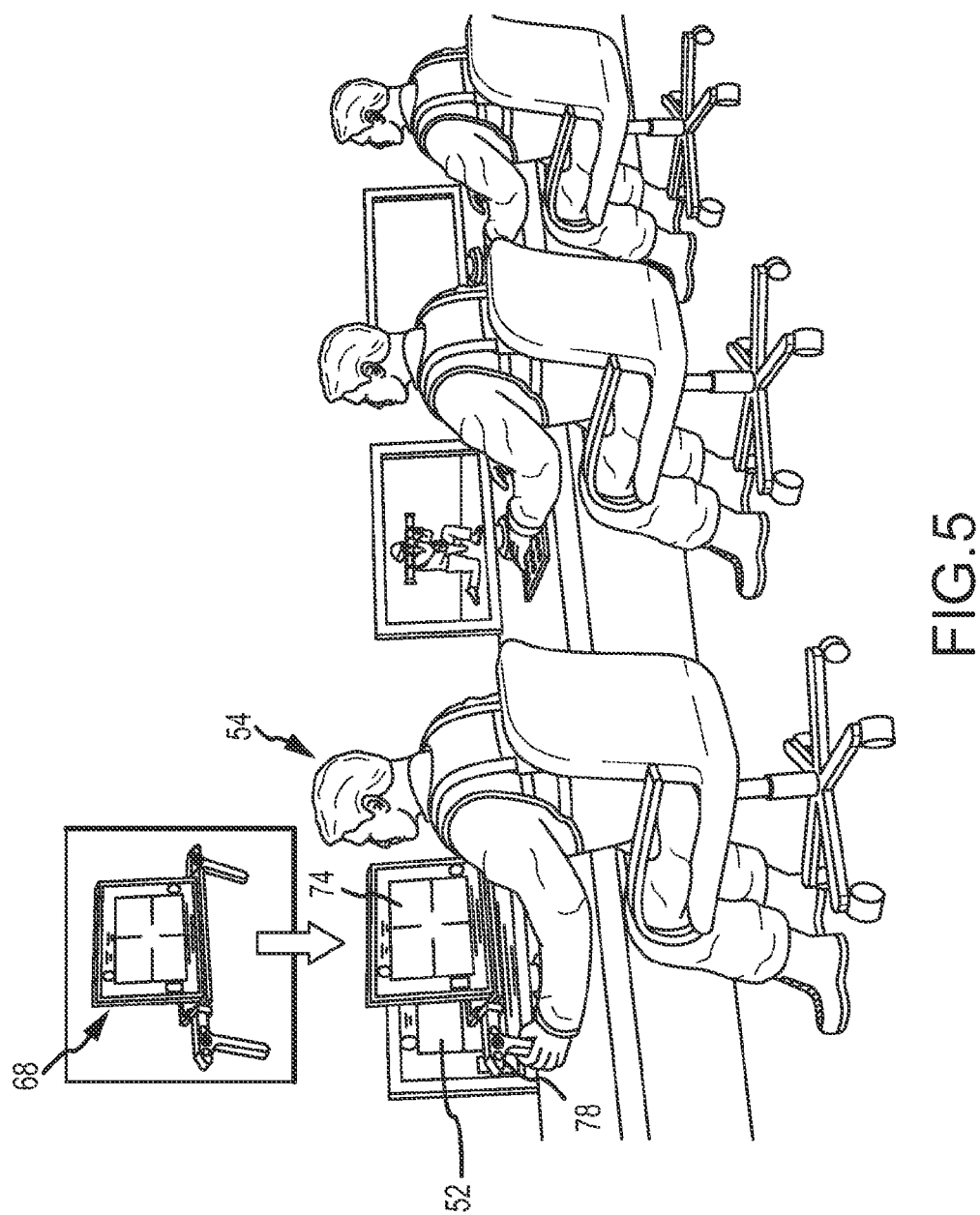
FIG. 5 is a diagram of an embodiment of the use of a UHOT within a multiuser interactive training simulator.

FIG. 5 depicts UHOT 68 in use in a multiuser interactive training simulator environment. A number of soldiers 54 are seated at a table in front of their own training simulators 52 to train on a multiuser training scenario. One of the soldiers tasked with operating a weapons system has picked up the UHOT by handgrips 78 and activated the UHOT. The training simulator directs the simulation video signal to the UHOT's direct-view display 74. The soldier interacts with the simulation by changing the viewpoint via his physical connection to the UHOT through handgrips 78 and pressing the buttons on the handgrips 78. When the portion of the training scenario involving that weapon system is complete, the UHOT is deactivated and the soldier places the UHOT back on the table. If called for in that or another training scenario, the soldier can detach the handgrips for say Javelin and attach handgrips for say ITAS and train on the ITAS system. The other soldiers may have a UHOT provided with different handgrips to train on different weapons systems. When not using UHOT, the soldier interacts with the simulation using the simulator's input device such as keyboard or gamepad.

FIG. 6 depicts a UHOT 80 in use in a multiuser interactive training simulator environment in which the interactive training simulator is integrated into the UHOT. The host computer, simulators and plug-ins reside within the UHOT in either the direct-view display or the docking station. The UHOT's direct-view display is used for the entire training scenario. UHOT 80 may be placed in a cradle 82 on the desk when the soldier is using an input device 84 (mouse, keyboard, joystick, gamepad) to interact with the simulation. In the case of Javelin, when the weapon system is activated the soldier 86 picks UHOT 80 up out of the cradle via the handgrips and performs the Javelin training. For other weapon systems such as ITAS and LRAS3, the real tactical system is mounted on and rotated about a gimbal. In these cases, the cradle may be mounted on a gimbal to mimic the rotation of the tactical weapon. The soldier grabs the handgrips and rotates the UHOT about the gimbal to interact with the simulation. As shown, one soldier is using input device 84 to interact with the simulation while the other soldier is using the tactical handgrips of the UHOT to train on the weapons system within the simulation.

As shown in FIGS. 7*a* and 7*b*, a soldier presses a button 90 on tactical handgrips 92 to change the view of the simulation video signal from a "day sight" 94 to a "night sight" 96. By training with the UHOT, the soldier not only trains on and learns function of the weapon system but also ingrains into his muscle memory the "fit" of the button presses for that weapon's handgrips.

FIGS. 8*a*-8*d* are front, rear and side views with and without handgrips of an embodiment of a UHOT 100 provided with a universal connector for attaching and detaching different tactical handgrips 102. The tactical handgrips 102 are the same handgrips that are used on either the real tactical weapon system or on the BST. Typically, handgrips that do not pass the military standard inspection and thus are not acceptable for the tactical systems can be used for either the BST or UHOT. In the tactical system and BST the handgrips are hardwired to the assembly during manufacture. The UHOT is suitably configured so that the same handgrips can be attached and detached. However, if desired, a specific pair of tactical handgrips (e.g. Javelin grips) could be hardwired to the UHOT that is then dedicated to training only Javelin (or other systems that might use the same handgrips). But in general, it is preferable to configure UHOT as a modular "device" that can be reconfigured with different tactical handgrips for use with a variety of weapon systems.

In this exemplary embodiment, UHOT 100 comprises a docking station 102, a direct-view display 104 (suitably a 10"-14" LCD) mounted on the docking station and left and right tactical handgrips 106 and 108 electrically and mechanically attached to the docking station's universal connector 110 via adapters 112 that interface between the universal connector and the handgrip-specific connector. The docking station comprises a video in port 114 such as a VGA connection, a bi-directional data port 116 such as a USB connection and a power connection 118 for connection to either the training simulator or an external power source.

Figure 9:
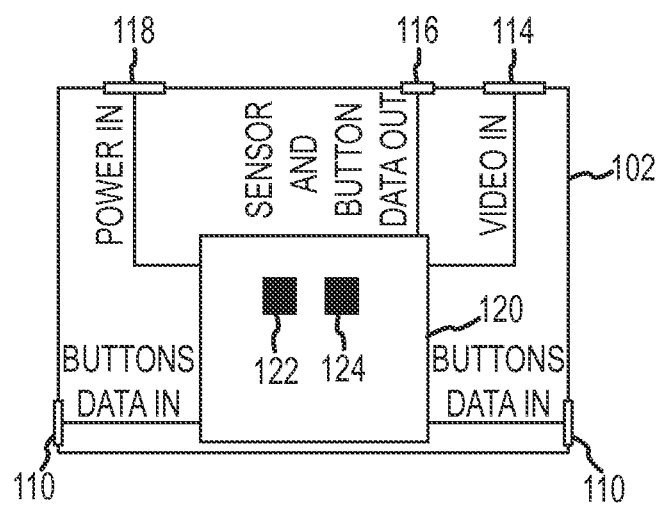
FIG. 9 is a block diagram of an embodiment of the UHOT docking station.

As shown in FIG. 9, in an exemplary embodiment docking station 102 comprises a microcontroller 120 and motion sensors such as a gyro sensor 122 and an accelerometer sensor 124. Microcontroller 120 receives power in from power connection 118, the video simulation signal from video in port 114, button press data in from universal connector 110 and viewpoint data from sensors 122 and 124 and data from the simulator at bi-directional data port 116. The microcontroller routes the simulation video signal to the direct-view display. The microcontroller converts the button press and viewpoint data (e.g. analog electrical signals) into binary data and routes to bi-directional data port 116.

Because the UHOT does not mimic the "form" of any particular piece of equipment, the UHOT can be configured as a modular platform for training on a variety of equipment by attaching different tactical handgrips. This would be quite simple to accomplish if all of the handgrips had the same electro-mechanical connector. However, generally speaking the different handgrips have different electro-mechanical connectors, different mechanical connections and different electrical pin outs. To accommodate these differences, the UHOT may be provided with a "universal" connector that may or may not interface directly with any of the tactical handgrips. Handgrip specific adapters are provided that have a universal mating connector on one side to attach to the UHOT's universal connector and a handgrip specific connector on the other side to attach to that handgrip's electro-mechanical connector. The pins from the handgrip connector to the universal mating connector are connected in a manner known to the simulator and plug-in.

FIGS. 10*a*-10*b* and 11*a*-11*b* illustrate the connectors and adapters for two different handgrips "X" 150 and "Y" 152. Handgrip "X" has a circular female connector 154 while handgrip "Y" has a rectangular female connector 156. The number and arrangement of pins in the connectors is different. Adapter 158 for handgrip X has a circular male connector 160 for mating with circular female connector 154 and a circular female connector 162 for mating with the UHOT's universal male connector. Adapter 164 for handgrip Y has a rectangular male connector 166 for mating with rectangular female connector 156 and the same circular female connector 162 for mating with the UHOT's universal male connector. The two connectors may be separated by an extension such that the handgrips when attached have the same separation as the tactical system. The length of this extension may vary with handgrip. Furthermore, the same handgrips may have multiple adapters with different length extensions for use with different pieces of equipment.

As shown in FIG. 12, when fitted with adapter 158 handgrip X 150 can be attached to (and detached from) the UHOT's universal connector 170 via universal mating connector 162. Similarly, when fitted with adapter 164 handgrip Y 152 can be attached to (and detached from) the UHOT's universal connector 170.

Figure 13:
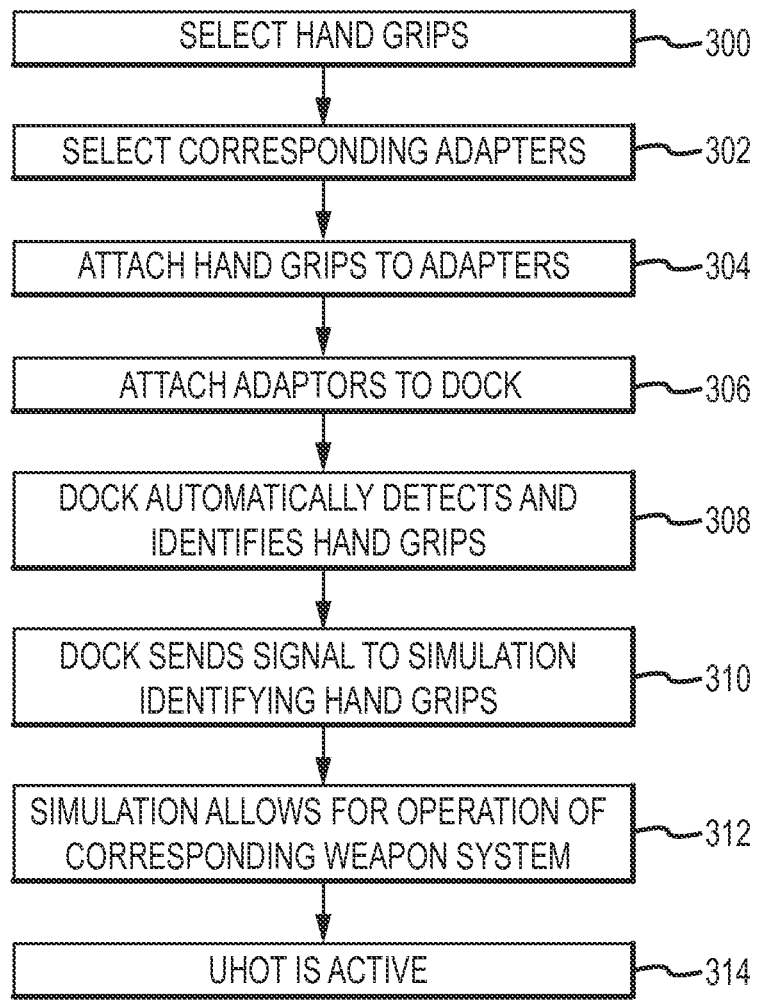
FIG. 13 is a flow diagram for configuring the UHOT for use with particular handgrips.

As described in FIG. 13, the UHOT and interactive training simulator may be configured to automatically recognize and identify the tactical handgrips attached to the UHOT to activate the corresponding weapon module and plug-in and the UHOT. In an exemplary embodiment, a soldier selects a pair of tactical handgrips (step 300) and selects a corresponding pair of adapters (step 302). The soldier attaches the handgrips to the adapters (step 304) and attaches the adapters to the docking station (step 306). The docking station automatically detects and identifies the handgrips (step 308) and sends a signal to the simulation identifying the handgrips (step 310). The simulator activates the corresponding simulations and plug-in to allow for operation of the weapon system (step 312) such that the UHOT is active (step 314). In an alternate embodiment, the docking station could detect that handgrips are attached and generate an on-screen menu on either the simulator's or docking station's display allowing for user selection of the handgrips and corresponding weapon system.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A training simulator for training a user to operate a piece of equipment having a form, fit and function, said piece of equipment having tactical handgrips that provide the equipment's fit, said handgrips having one or more buttons that allow the user to operate the equipment, said piece of equipment having an assembled shape and structure that provides the equipment's form, said training simulator comprising a hand-held universal hands-on trainer (UHOT) that comprises:
    a direct-view display for displaying a training simulation video signal for the piece of equipment;
    a pair of said tactical handgrips that provide the UHOT with the fit of the piece of equipment and allow the user to hold and maneuver the entire UHOT free of any physical support; and
    a docking station that supports said direct-view display, said docking station housing:
        a pair of connectors for electro-mechanically attaching the pair of tactical handgrips on opposite sides of the docking station and the direct-view display supported thereon, said connectors responsive to electrical button pushes from the handgrips in response to user interaction with the displayed training simulation video signal;
        one or more sensors for detecting user instigated motion of the entire UHOT instigated via the handgrips to generate electrical sensor signals of a changing viewpoint within the simulation; and
        a microcontroller that converts the electrical button pushes and the electrical sensor signals to binary data, said training simulator video signal responsive to said binary data,
    said hand-held UHOT having a different and scaled-down assembled shape and structure that provide a different form than said piece of equipment.

2. The training simulator of claim 1, wherein said hand-held UHOT's assembled shape and structure is both smaller and lighter weight than the piece of equipment.

3. The training simulator of claim 2, wherein said piece of equipment is a weapon system comprising a live weapon, said hand-held UHOT comprising neither a live nor a dummy weapon.

4. The training simulator of claim 2, wherein said hand-held UHOT's only physical user interface is through the pair of handgrips.

5. The training simulator of claim 1, further comprising a software plug-in that translates the binary data into button pushes and viewpoint data.

6. The training simulator of claim 5, further comprising:
    an interactive training simulator comprising a host computer, an environment simulator that runs on the host computer for one or more single or multi-user training scenarios to generate the training simulation video signal that is displayed on a direct-view display, said environment simulator comprising at least an equipment module that simulates the use of the piece of equipment in the training scenario, and an input device for user interaction with the simulation,
    said software plug-in resident with the interactive training simulator on the host computer to provide connectivity to the equipment module to simulate the function of the piece of equipment.

7. The training simulator of claim 6, wherein said host computer is external to said hand-held UHOT, said hand-held UHOT further comprising a video in port for receiving the training simulation video signal from the host computer and a bi-directional data port for transmitting said binary data to said host computer and receiving data from said host computer.

8. The training simulator of claim 6, wherein said host computer is internal to said hand-held UHOT, said hand-held UHOT and said interactive training simulator sharing the direct-view display.

9. The training simulator of claim 8, further comprising a cradle, said hand-held UHOT supported in and removable from said cradle by the user to hold and maneuver the entire UHOT.

10. The training simulator of claim 6, further comprising:
    a basic skills trainer (BST) having a pair of said tactical grips that is a mock-up of the piece of equipment and replicates both the equipment's form and fit, said BST outputting binary data for button pushes and changing viewpoint,
    said plug-in converting the BST's binary data to button pushes and viewpoint data to provide connectivity to the equipment module.

11. The training simulator of claim 1, wherein said docking station's pair of connectors are a universal connector, further comprising:
    multiple pairs of different tactical handgrips having different electro-mechanical connectors; and
    multiple pairs of electro-mechanical adapters for the respective tactical handgrips, each adapter comprising an equipment-specific connector configured to mate with the handgrip connector and a universal mating connector to mate with the docking station's universal connector to attach and detach any of said different tactical handgrips.

12. The training simulator of claim 11, wherein said docking station detects whether handgrips are attached to the universal connector, identifies the attached handgrips and generates binary data identifying the handgrips.

13. The training simulator of claim 6, wherein said docking station's pair of connectors are a universal connector, further comprising:
multiple different equipment modules in said environment simulator;
multiple different plug-ins for said different equipment modules;
multiple pairs of different tactical handgrips having different electro-mechanical connectors; and
multiple pairs of electro-mechanical adapters for the respective tactical handgrips, each adapter comprising an equipment-specific connector configured to mate with the handgrip connector and a universal mating connector to mate with the docking station's universal connector to attach and detach any of said different tactical handgrips,
wherein said docking station detects whether handgrips are attached to the universal connector, identifies the attached handgrips and generates binary data identifying the handgrips, and
wherein said interactive simulator module activates the equipment module and plug-in corresponding to the attached tactical handgrips.

14. A training simulator, comprising:
an interactive training simulator comprising a host computer, an environment simulator that runs on the host computer for one or more single or multi-user training scenarios to generate a training simulation video signal that is displayed on a direct-view display, said environment simulator comprising at least an equipment module that simulates the use of a piece of equipment having a form, fit and function in the training scenario, said equipment provided with tactical handgrips that provide the equipment's fit, said handgrips having one or more buttons that allow the user to operate the equipment, said piece of equipment having an assembled shape and structure that provides the equipment's form, and an input device for user interaction with the simulation;
a hand-held universal hands-on trainer (UHOT) comprising:
a direct-view display;
a pair of the tactical handgrips that provide the UHOT with the fit of the piece of equipment and allow the user to hold and maneuver the entire UHOT free of any physical support; and
a docking station that supports the direct-view display, said docking station housing:
a video in port for receiving the training simulation video signal and displaying it on the display;
a pair of connectors for electro-mechanically attaching the pair of tactical handgrips on opposite sides of the docking station and the direct-view display supported thereon, said connectors responsive to electrical button pushes from the handgrips in response to user interaction with the simulation video signal;
one or more sensors for detecting user instigated motion of the entire UHOT instigated via the handgrips to generate electrical sensor signals of a changing viewpoint within the simulation;
a microcontroller that converts electrical button pushes and electrical sensor signals to binary data; and
a bi-directional port for transmitting and receiving the binary data;
said hand-held UHOT having a different and scaled-down assembled shape and structure than said piece of equipment, and
a software plug-in that resides with the interactive training simulator on the host computer, said plug-in translating the binary data into button pushes and viewpoint data to provide connectivity to the equipment module to simulate the function of the piece of equipment in the environment simulator,
wherein said UHOT and training simulator provide the fit and function of the piece of equipment but not the form.

15. The training simulator of claim 14, wherein said UHOT's assembled shape and structure is both smaller and lighter weight than the piece of equipment.

16. The training simulator of claim 15, wherein said piece of equipment is a weapon system comprising a live weapon, said UHOT comprising neither a live nor dummy weapon.

17. The training simulator of claim 15, wherein said UHOT's only physical user interface is through the pair of handgrips.

18. The training simulator of claim 14, further comprising:
a basic skills trainer (BST) having a pair of said tactical grips that is a mock-up of the piece of equipment and replicates both the equipment's form and fit, said BST outputting binary data for button pushes and changing viewpoint,
said plug-in converting the BST's binary data to button pushes and viewpoint data to provide connectivity to the equipment module.

19. The training simulator of claim 14, wherein said docking station's pair of connectors are a universal connector, further comprising:
multiple different equipment modules in said environment simulator;
multiple different plug-ins for said different equipment modules;
multiple pairs of different tactical handgrips having different electro-mechanical connectors; and
multiple pairs of electro-mechanical adapters for the respective tactical handgrips, each adapter comprising an equipment-specific connector configured to mate with the handgrip connector and a universal mating connector to mate with the docking station's universal connector to attach and detach any of said different tactical handgrips,
wherein said docking station detects whether handgrips are attached to the universal connector, identifies the attached handgrips and generates binary data identifying the handgrips, and
wherein said interactive simulator module activates the equipment module and plug-in corresponding to the attached tactical handgrips.

20. A training simulator for training a user to operate different pieces of equipment provided with different tactical handgrips having one or more buttons that allow the user to operate the equipment, said different tactical handgrips having different electro-mechanical connectors, said training simulator comprising a hand-held universal hands-on trainer (UHOT) that comprises:
a direct-view display for displaying a training simulation video signal for a specific piece of equipment;
multiple pairs of the different tactical handgrips, each said pair allowing the user to hold and maneuver the handheld UHOT free of any physical support;

multiple pairs of electro-mechanical adapters for the respective tactical handgrips, each adapter comprising an equipment-specific connector configured to mate with the handgrip connector and a universal mating connector; and a docking station that supports said direct-view display, said docking station housing:

a pair of universal connectors for electro-mechanically mating with the pair of adapters' universal mating connectors to attach and detach any of the different tactical grips on opposite sides of the docking station and the direct-view display supported thereon, said universal connectors responsive to electrical button pushes from the handgrips in response to user interaction with the displayed training simulator video signal;

one or more sensors for detecting user instigated motion of the UHOT via the handgrips to generate electrical sensor signals of a changing viewpoint within the simulation, said direct-view display moving with the user instigated motion; and a microcontroller that converts the electrical button pushes and the electrical sensor signals to binary data, said training simulation video signal responsive to said binary data.

21. The training simulator of claim 20, wherein said adapters have varying lengths to provide the fit for the corresponding piece of equipment.

22. The training simulator of claim 20, wherein said piece of equipment has a form, fit and function, said handgrips providing the equipment's fit, said equipment's assembled shape and structure providing its form, wherein the UHOT's tactical handgrips provide the fit of the piece of equipment, wherein said UHOT has a different and scaled-down assembled shape and structure that provide a different form than said piece of equipment.

23. The training simulator of claim 22, wherein the UHOT's assembled shape and structure is both smaller and lighter weight than said piece of equipment.

24. The training simulator of claim 20, further comprising:

an interactive training simulator comprising a host computer, an environment simulator that runs on the host computer for one or more single or multi-user training scenarios to generate the training simulation video signal that is displayed on a direct-view display, said environment simulator comprising multiple different equipment module corresponding to different tactical handgrips that simulate the use of the piece of equipment in the training scenario, and an input device for user interaction with the simulation, multiple software plug-ins for the different paired handgrips and equipment resident with the interactive training simulator on the host computer, said plug-in for the attached pair of handgrips translating the binary data into button pushes and viewpoint data to provide connectivity to the corresponding equipment module to simulate the function of the piece of equipment.

25. The training simulator of claim 24, wherein said UHOT recognizes the attached handgrips and send an identifier to said interactive training simulator, which in turn activates the corresponding equipment module and plug-in.

\* \* \* \* \*